United States Patent
Huang (10) Patent No.: US 6,766,833 B1
(45) Date of Patent: Jul. 27, 2004

(54) DEVICE FOR INSERTING WIRES INTO A TUBULAR SHEATH

(75) Inventor: Kuo-Hao Huang, Taipei (TW)

(73) Assignee: Heshan Jian Hao Lighting Ind. Co., Ltd., He Shan (CN)

( * ) Notice: Subject to any disclaimer, the term of this patent is extended or adjusted under 35 U.S.C. 154(b) by 0 days.

(21) Appl. No.: 10/341,516

(22) Filed: Jan. 13, 2003

(51) Int. Cl.[7] .............................................. B21F 15/06
(52) U.S. Cl. ...................... 140/123; 29/755; 174/68.3
(58) Field of Search ............................. 140/117, 123; 29/235, 270, 278, 755; 57/3, 10; 174/68.3

(56) References Cited

U.S. PATENT DOCUMENTS 6,429,378 B2 * 8/2002 Shak ........................... 174/135
6,655,014 B1 * 12/2003 Babini ........................ 29/755

* cited by examiner

Primary Examiner—Lowell A. Larson
(74) Attorney, Agent, or Firm—Jackson Walker LLP (57) ABSTRACT

A device has two half shells combined with each other and a connecting tab connected between the half shells. Each half shell has a wire-holding portion, a guiding portion and a gripping wing. The wire-holding portion has a semi-circular cross section, and the guiding portion inclinedly protrudes from the top side of the wire-holding portion and has a semi-circular cross section to define a guiding depression between the outer periphery of the wire-holding portion. The gripping wing is formed on the bottom side of the wire-holding portion. Accordingly, wires or cables can be easily and conveniently inserted into a tubular sheath through the device.

5 Claims, 9 Drawing Sheets

DEVICE FOR INSERTING WIRES INTO A TUBULAR SHEATH

BACKGROUND OF THE INVENTION

1. Field of the Invention

The present invention relates to a device, and more particularly to a device for conveniently inserting wires into a tubular sheath.

2. Description of Related Art

Figure 9:
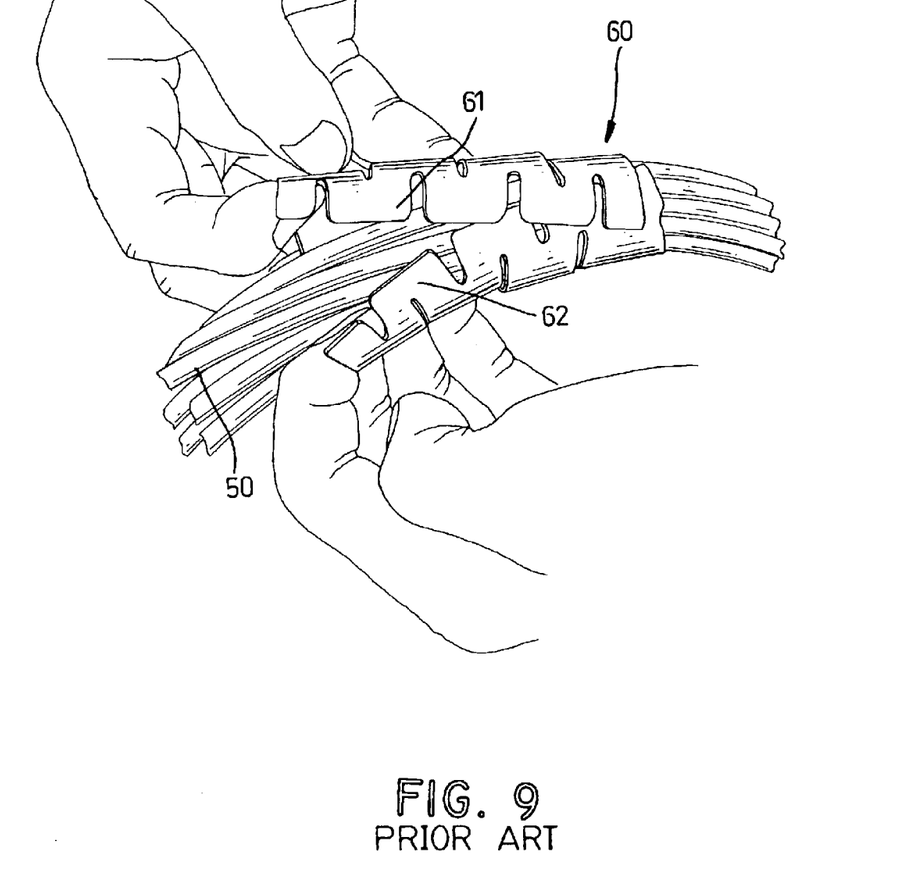
FIG. 9 is an operational perspective view of a conventional tubular sheath showing that the wires are inserted into the conventional tubular sheath with hands of a user.

Wires or cables are very important to transmit power, data or signals to or between electrical apparatuses, such as computers. For example, there are many wires and cables connecting between the power source, the main engine and the I/O device, such as a monitor, a printer, a keyboard, a mouse and so on in a computer system. Without appropriate trimming, the wires and cables spread out to make an unsightly jumble and the tangled mess makes it difficult to trace wiring faults. A conventional way to trim the wires or cables is to bind the wires or cables with ropes. However, the conventional way takes too much time for a person to bind the wires or cables. With reference to FIG. 9, another conventional way to trim the wires (50) or cables is put the sections of wires (50) or cables into a tubular sheath (60) with openable overlapping edges (61,62). The edges (61,62) of the sheath (60) are opened, and sections of the wires (50) and the cables are inserted into the sheath (60). After the opened edges (61,62) are released, the edges (61,62) will automatically close to enclose the sections of the wires (50) in the sheath (60). Consequently, the wires (50) and cables are trimmed together to keep them from spreading out.

However, to open the edges (61,62) of the sheath (60) and to insert the wires (50) or cable into the sheath (60) simultaneously is difficult for a user, such that the use of the sheath (60) is inconvenient.

To overcome the shortcomings, the present invention tends to provide a device for inserting wires into a tubular sheath to mitigate or obviate the aforementioned problems.

SUMMARY OF THE INVENTION

The main objective of the invention is to provide a device for inserting wires into a tubular sheath conveniently. The device has two half shells combined with each other and a connecting tab connected between the half shells. Each half shell has a wire-holding portion, a guiding portion and a gripping wing. The wire-holding portion has a semi-circular cross section, and the guiding portion inclinedly protrudes from the top side of the wire-holding portion and has a semi-circular cross section to define a guiding depression between the outer periphery of the wire-holding portion. The gripping wing is formed on the bottom side of the wire-holding portion. Accordingly, wires or cables can be easily and conveniently inserted into a tubular sheath through the device.

Other objects, advantages and novel features of the invention will become more apparent from the following detailed description when taken in conjunction with the accompanying drawings.

DETAILED DESCRIPTION OF PREFERRED EMBODIMENT

Figure 1:
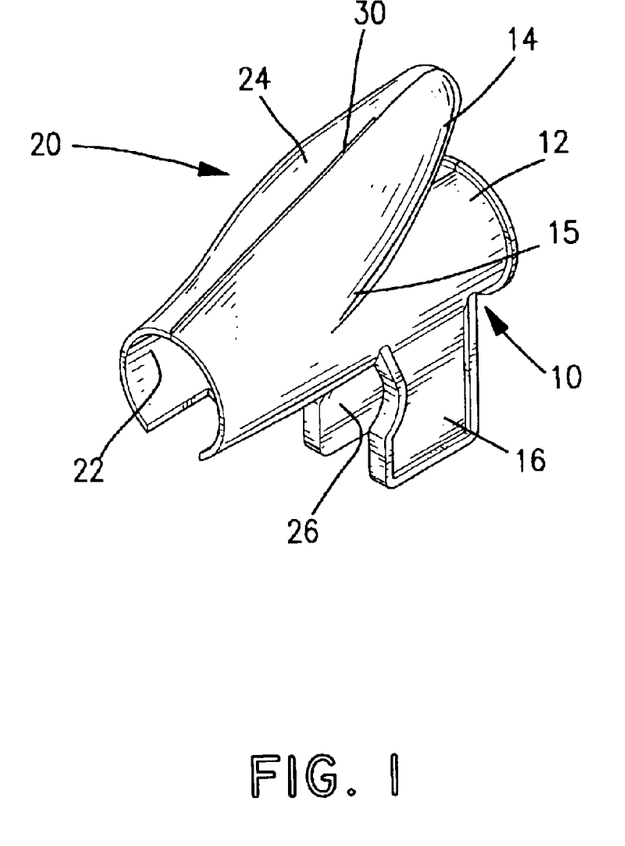
FIG. 1 is a perspective view of a device for inserting wires into a sheath in accordance with the present invention.
Figure 2:
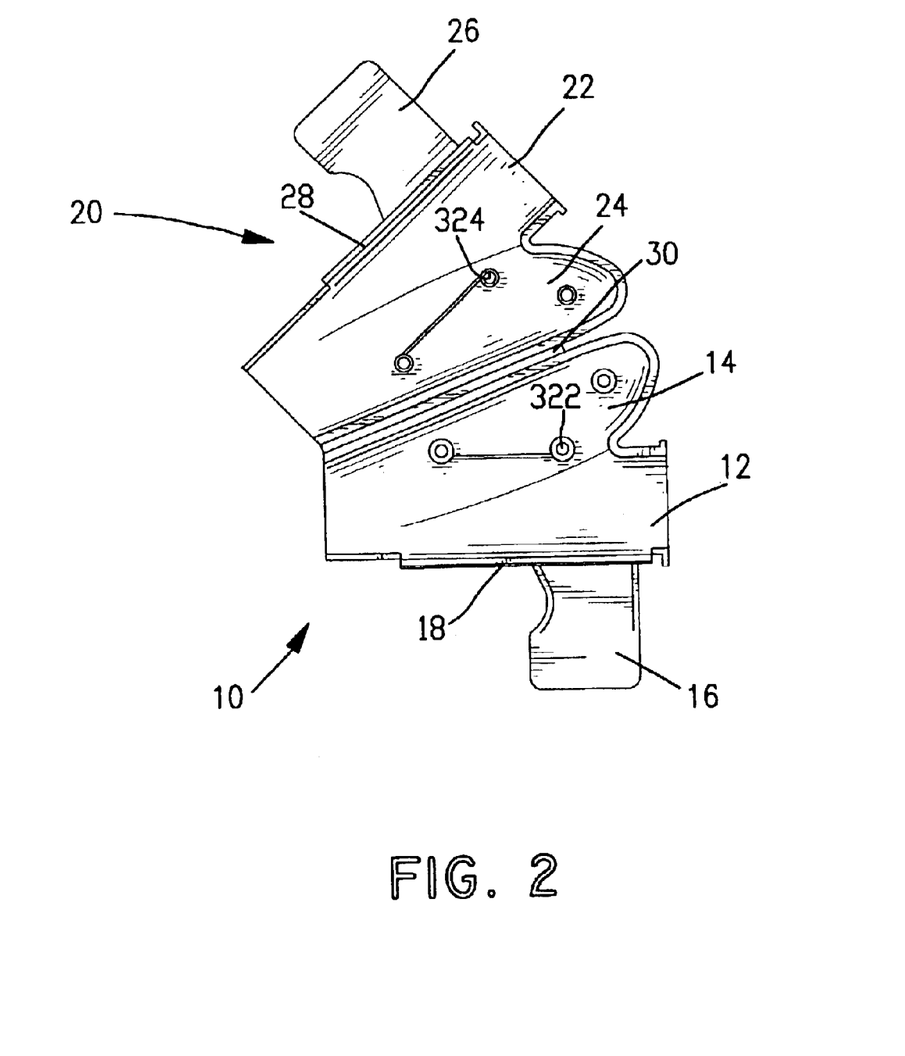
FIG. 2 is a side plan view of the device in FIG. 1 showing that the device is in an expansion condition.
Figure 3:
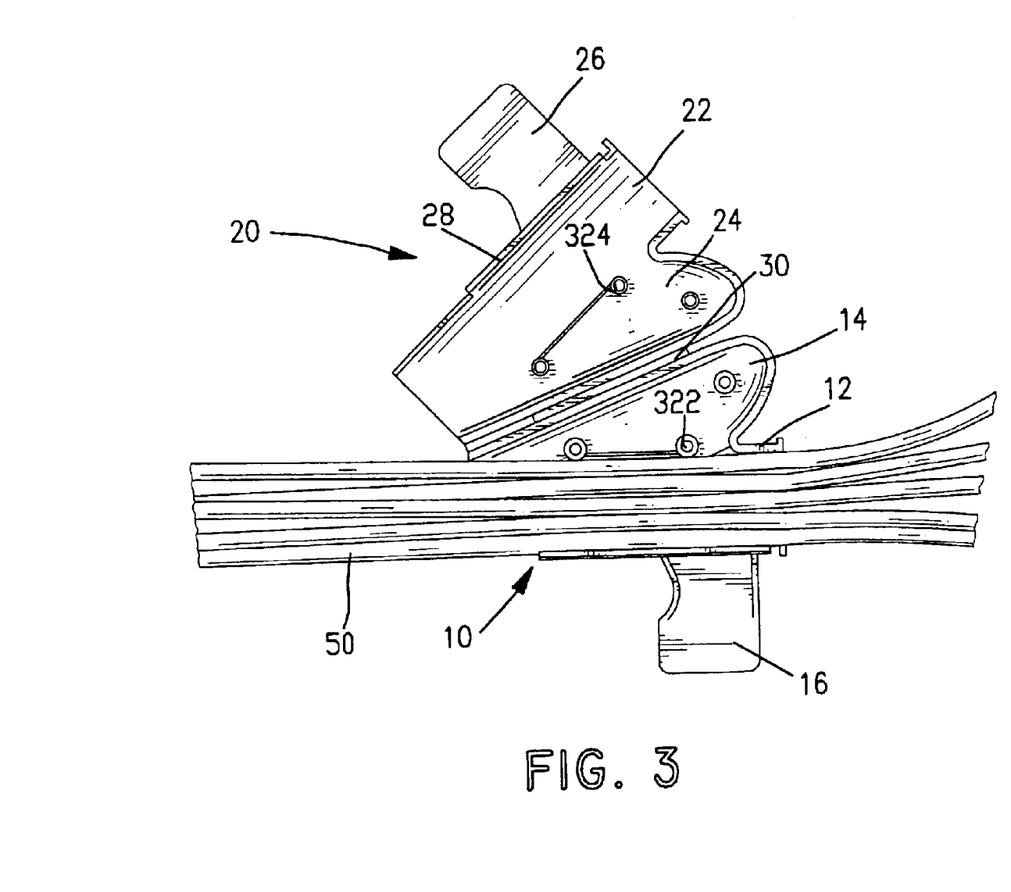
FIG. 3 is an operational side plan view of the device in FIG. 1 showing that wires are received in the wire-holding portion of one half shell of the device.
Figure 4:
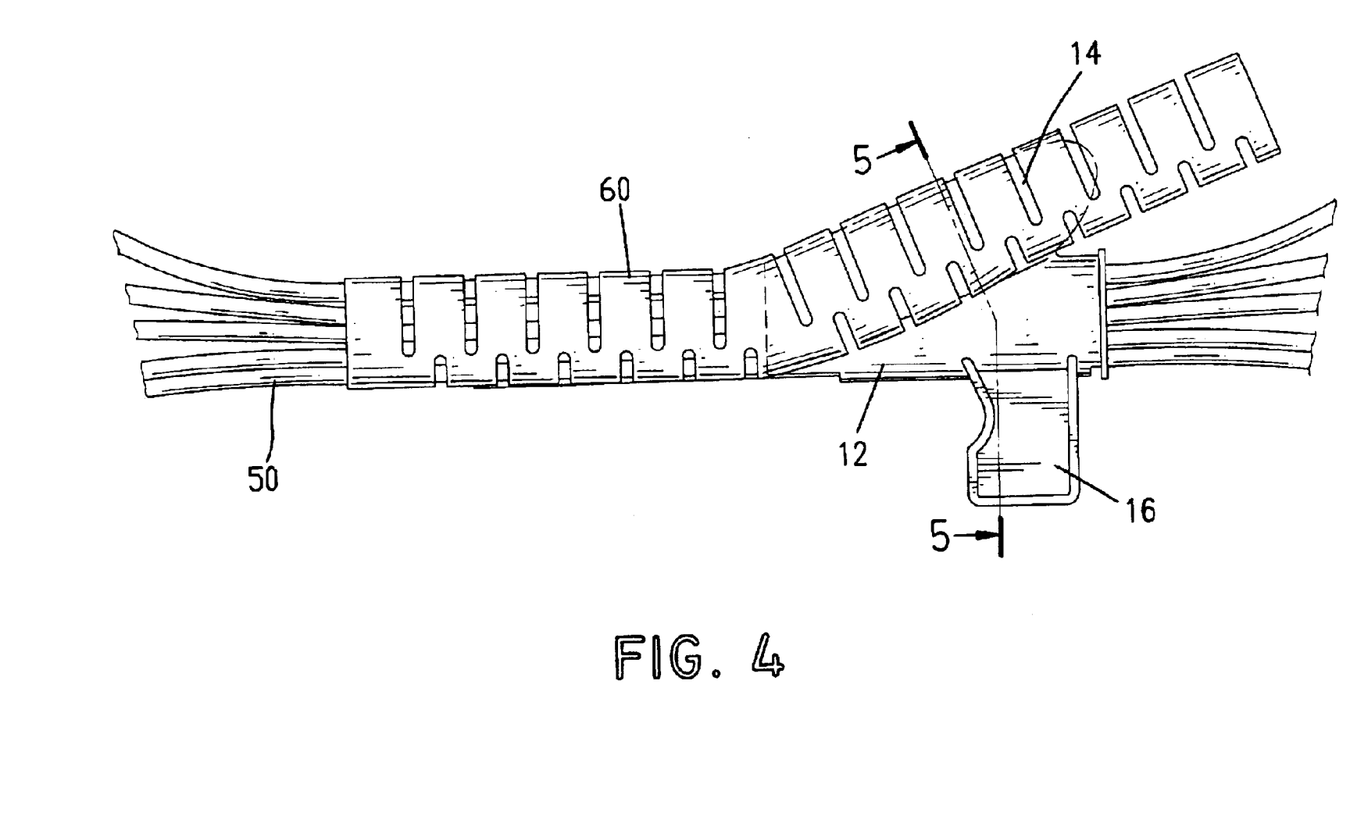
FIG. 4 is an operational perspective view of inserting wires into a sheath through the device in FIG. 1 showing that the device is moved along the sheath.
Figure 5:
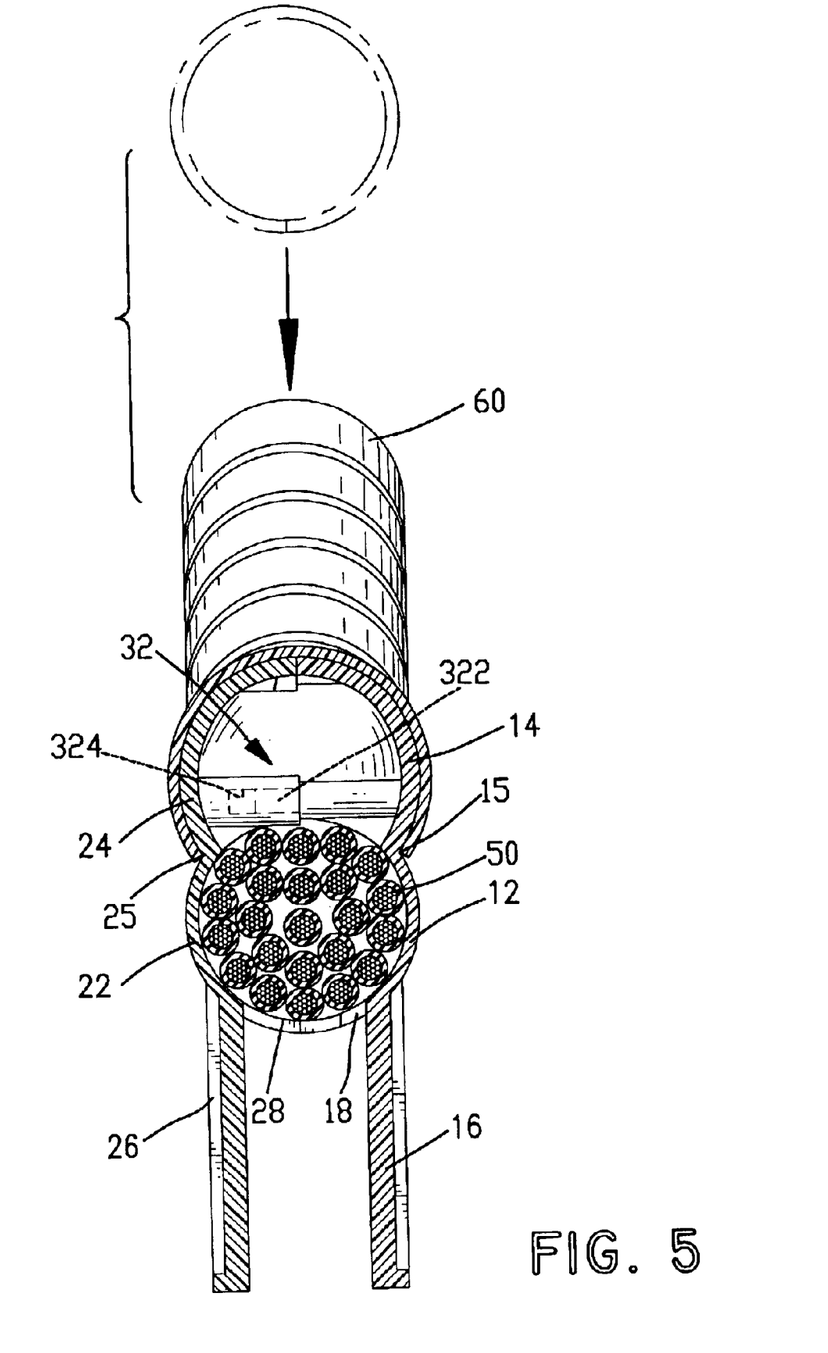
FIG. 5 is a side plan view in partial cross section of the sheath, the wire and the device along line 5—5 in FIG. 4.
Figure 6:
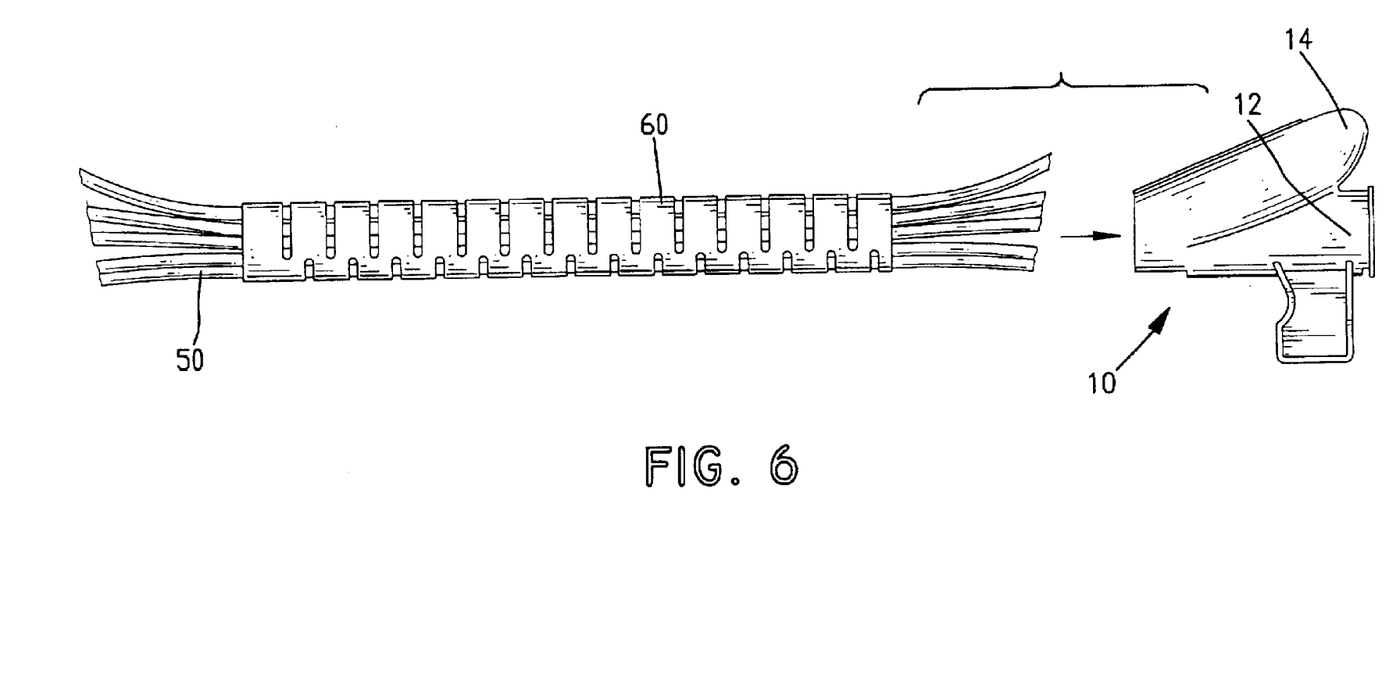
FIG. 6 is a side plan view showing that sections of wires are enclosed in the sheath after the device in FIG. 4 passing through the sheath.

With reference to FIGS. 1, 2 and 5, a device for inserting wires into a tubular sheath in accordance with the present invention comprises two half shells (10,20) and a connecting tab (30). The half shells (10,20) are combined together and each has a wire-holding portion (12,22) with a semi-circular cross section to define a passage in cooperation with the wire-holding portion (12,22) on the other half shell (10,20) for wires to pass through the shells (10,20). A guiding portion (14,24) inclinedly protrudes from the top side of the wire-holding portion (12,22) of each respective half shell (10,20). The guiding portion (14,24) of each half shell (10,20) has an open end communicating with the wire-holding portion (12,22) and a closed end. The guiding portion (14,24) has a semi-circular cross section so as to define a guiding depression (15,25) between the outer periphery of the wire-holding portion (14,24). A gripping wing (16,26) is formed on the bottom side of the wire-holding portion (12,22) of each respective half shell (10,20), such that a user can hold the gripping wings (16,26) to move the device.

The connecting tab (30) is integrally connected between the guiding portions (14,24) of the two half shells (10,20), such that the half shells (10,20) form a single piece and can pivotally rotate relative to each other.

An engaging device (32) is mounted between the two half shells (10,20) to provide a temporary engaging effect to the half shells (10,20) when the half shells (10,20) are closed together. In a first embodiment, the engaging device (32) comprises multiple stubs (322) formed on the first half shell (10) and multiple holes (324) defined in the second half shell (20) and corresponding to the stubs (322) in the first half shell (10). When the half shells (10,20) are closed, the stubs (322) will be respectively received in holes (324) so as to provide an engaging effect to the half shells (10,20) to keep the half shells (10,20) from separating arbitrarily.

In operation, with reference to FIGS. 3 to 6, the half shells (10,20) are pivotally rotated to far away from each other, and sections of wires (50) or cables are put into the wire-holding portion (12) of one of the half shells (10). The half shells (10,20) are then pivotally rotated to combine together, such that the sections of the wires (50) will be received in the passage constructed by the wire-holding portions (12,22) of the half shells (10,20). Then, one end of a tubular sheath (60) that has openable overlapping edges is put onto the closed ends of the guiding portions (14,24) of the half shells (10,20). The edges of the tubular sheath (60) will be opened and will be respectively led into the guiding depressions (15,25) in the combined half shells (10,20). To move the device along the sheath (60), the guiding portions (14,24) of the device will automatically open the overlapping edges of the sheath (60) with the guiding effect provided by the guiding depressions (15,25), the opened edges of the sheath (60) will enclose the outer peripheries of the wire-holding portions (12,22). When the opened edges have moved past the wire-holding portions (12,22), the opened edges will automatically overlap and enclose the wires (50) passing through the wire-holding portions (12,22). Consequently, the wires (50) will be automatically enclosed in the tubular sheath (60) by means of moving the device along the sheath (60), such that to trim wires (50) into the tubular sheath (60) with the device in accordance with the present invention is easy and convenient.

With reference to FIGS. 2 and 5, a tab (18,28) laterally extends from the bottom side of the wire-holding portion (12,22) of each respective half shell (10,20). When the half shells (10,20) are closed, the tabs (18,29) will contact with each other. This can close a gap defined between the bottom sides of the wire-holding portions (12,22) of the half shells (10,20) to keep the wires (50) from escaping from the gap.

Figure 7:
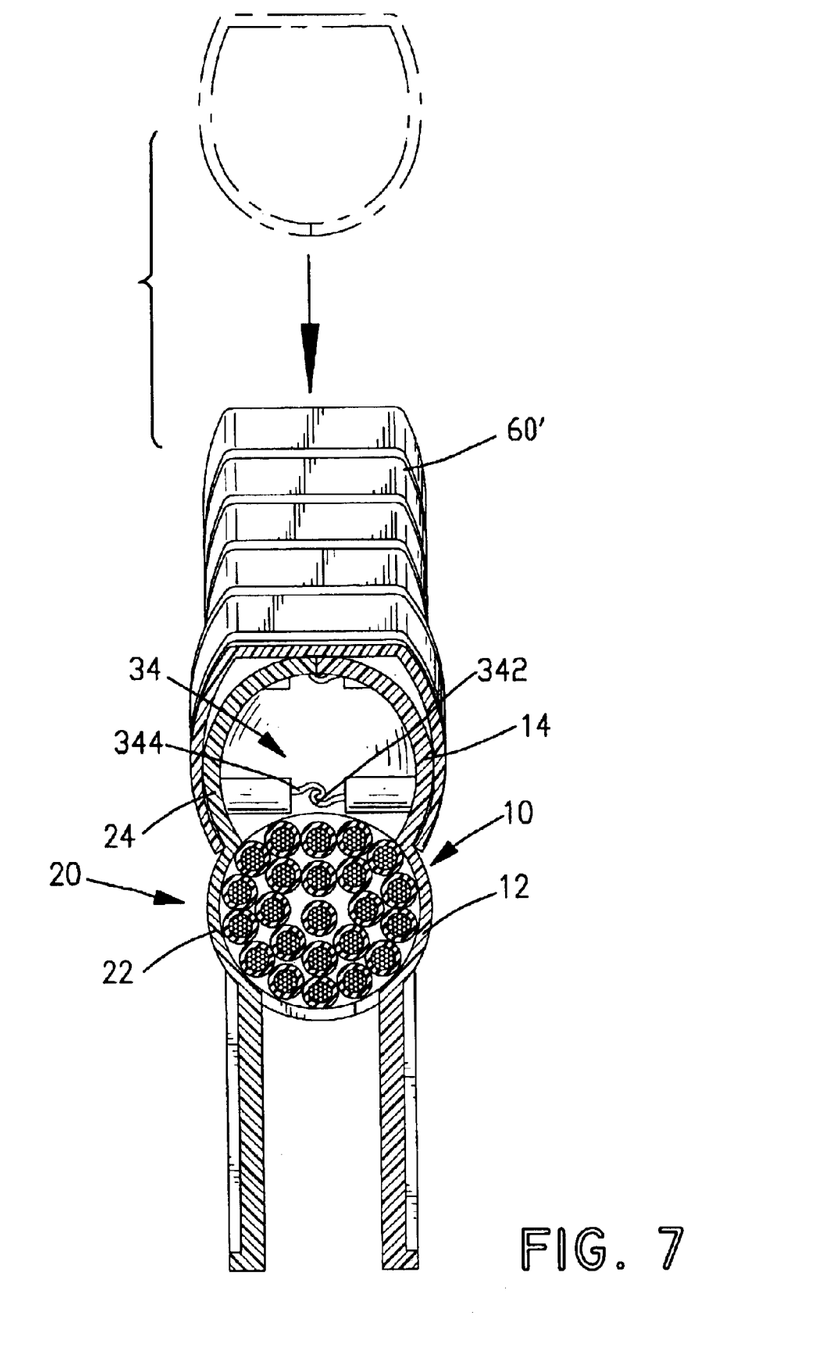
FIG. 7 is a side plan view in partial cross section of another embodiment of a device for inserting wires into a sheath with a flat edge in accordance with the present invention.
Figure 8:
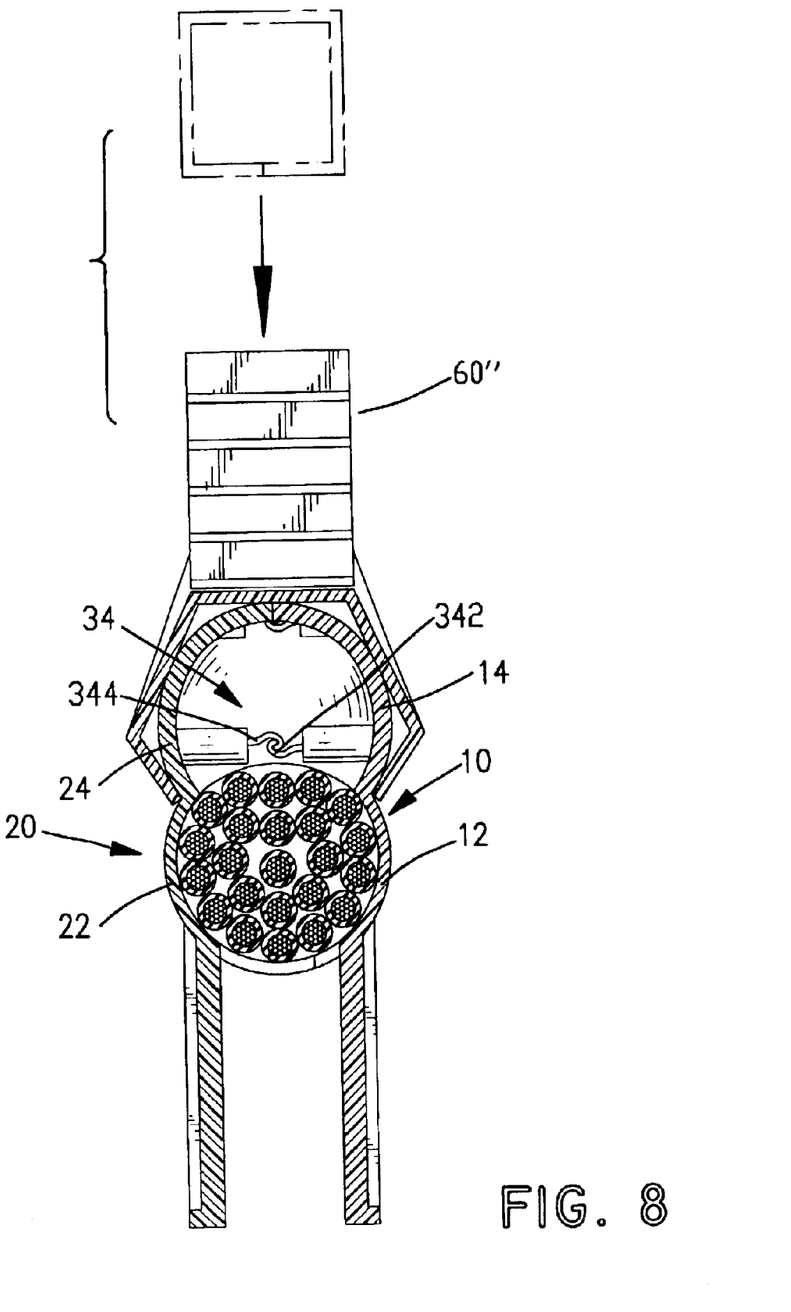
FIG. 8 is a side plan view in partial cross section of a device for inserting wires into a sheath having a rectangular cross section in accordance with the present invention.

In a second embodiment of the engaging device between the two half shells (10,20), with reference to FIGS. 7 and 8, the engaging device (34) comprises multiple first hooks (342) and multiple second hooks (344). The first hooks (342) are formed on the first half shell (10), and each second hook (344) is formed on the second half shell (20) and corresponds to one of the first hooks (342) on the first half shell (10). When the half shells (10,20) are combined together, the first hooks (342) will engage with the second hooks (344) to keep the half shells (10,20) from separating from each other.

In addition, the device in accordance with the present invention can fit with a sheath (60) having a circular cross section as shown in FIG. 5. The device can also fit with a sheath (60',60") having a flat edge as shown in FIG. 7 or a rectangular cross section as shown in FIG. 8. Accordingly, the wires (50) or cables can be attached to a flat object, such as a wall, a table side, the ground and so on, with the sheath (60',60") having a flat edge. The use of the device in accordance with the present invention is versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device for inserting wires into a sheath comprising:
   a first half shell and a second half shell integrally combined with each other, each half shell having:
   a wire-holding portion with an outer periphery, a top side and a bottom side and having a semi-circular cross section;
   a guiding portion inclinedly protruding from the top side of the wire-holding portion and having an open end communicating with the wire-holding portion and a closed end, wherein the guiding portion has a semi-circular cross section to define a guiding depression between the outer periphery of the wire-holding portion; and
   a gripping wing formed on the bottom side of the wire-holding portion; and
   a connecting tab integrally connected between the guiding portions of the two half shells to make the device a single piece.

2. The device for inserting wires into a tubular sheath as claimed in claim 1 further comprising an engaging device mounted between the two half shells, whereby the first and second half shells can be detachably combined.

3. The device for inserting wires into a tubular sheath as claimed in claim 2, wherein the engaging device comprises at least one hole defined in the first half shell and a stub formed on the second half shell and corresponding to each at least one hole in the first half shell to be received in the corresponding hole when the half shells are combined with each other.

4. The device for inserting wires into a tubular sheath as claimed in claim 2, wherein the engaging device comprises at least one first hook formed in the first half shell and a second hook formed on the second half shell and corresponding to each other at least one first hook in the first half shell to engage with the corresponding first hook when the half shells are combined with each other.

5. The device for inserting wires into a tubular sheath as claimed in claim 1, wherein the first half shell has a tab laterally extending from the bottom side of the wire-holding portion of the first half shell; and
   the second half shell has a tab laterally extending from the bottom side of the wire-holding portion of the second half shell to contact with the tab on the first half shell when the half shells are combined together so as to close a gap defined between the bottom sides of the wire-holding portions of the half shells.

* * * * *